US011270167B2

(12) United States Patent
Garrison et al.

(10) Patent No.: US 11,270,167 B2
(45) Date of Patent: *Mar. 8, 2022

(54) METHODS AND SYSTEMS FOR HYPER-SPECTRAL SYSTEMS

(71) Applicant: THE BOEING COMPANY, Chicago, IL (US)

(72) Inventors: William Thomas Garrison, Huntsville, AL (US); Mark A. Rivera, Laupahoehoe, HI (US); David Roderick Gerwe, West Hills, CA (US); Todd Harding Tomkinson, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/868,346

(22) Filed: May 6, 2020

(65) Prior Publication Data
US 2020/0334503 A1 Oct. 22, 2020

Related U.S. Application Data

(63) Continuation of application No. 15/492,236, filed on Apr. 20, 2017, now Pat. No. 10,657,422.

(51) Int. Cl.
*G06K 9/00* (2006.01)
*G06K 9/62* (2022.01)

(52) U.S. Cl.
CPC ....... *G06K 9/6277* (2013.01); *G06K 9/00637* (2013.01); *G06K 9/00657* (2013.01); *G06K 2009/00644* (2013.01)

(58) Field of Classification Search
CPC ....... G06K 9/6277; G06K 2009/00644; G06K 9/00657; G06K 9/00637; G06K 9/62
See application file for complete search history.

(56) References Cited

U.S. PATENT DOCUMENTS

| 5,479,255 A | * | 12/1995 | Denny | ............ | G01J 3/28 244/3.16 |
| 5,528,037 A | * | 6/1996 | Whitsitt | ............ | G01S 3/786 244/3.16 |

(Continued)

OTHER PUBLICATIONS

Dedicated Classification—Hyperspectral Imaging, M. Shimoni et al., IEEE, 978-1-4673-1559-5, 2012, pp. 1397-1400 (Year: 2012).*

(Continued)

*Primary Examiner* — Jayesh A Patel
(74) *Attorney, Agent, or Firm* — Armstrong Teasdale LLP

(57) ABSTRACT

A hyperspectral analysis computer device is provided. The hyperspectral analysis computer device includes at least one processor in communication with at least one memory device. The hyperspectral analysis computer device is configured to store a plurality of spectral analysis data, receive at least one background item and at least one item to be detected from a user, generate one or more spectral bands for analysis based on the at least one background item, the at least one item to be detected, and the stored plurality of spectral analysis data, receive one or more mission parameters from the user, and determine a probability of success based on the one or more mission parameters and the generated one or more spectral bands.

20 Claims, 6 Drawing Sheets

(56) References Cited

U.S. PATENT DOCUMENTS

| | | | | |
|---|---|---|---|---|
| 6,347,762 | B1* | 2/2002 | Sims | F41G 7/2226 |
| | | | | 244/3.1 |
| 6,353,673 | B1* | 3/2002 | Shnitser | G06K 9/58 |
| | | | | 382/103 |
| 6,958,466 | B1* | 10/2005 | Stein | G06K 9/0063 |
| | | | | 250/208.1 |
| 7,194,111 | B1* | 3/2007 | Schaum | G01V 8/10 |
| | | | | 348/144 |
| 7,505,608 | B2* | 3/2009 | Portigal | G06K 9/0063 |
| | | | | 382/103 |
| 8,891,875 | B2 | 11/2014 | Del Amo et al. | |
| 8,896,842 | B2 | 11/2014 | Bower et al. | |
| 8,989,501 | B2 | 3/2015 | Buehler et al. | |
| 9,104,120 | B2 | 8/2015 | Seligson et al. | |
| 9,122,929 | B2 | 9/2015 | Buehler et al. | |
| 9,271,643 | B2 | 3/2016 | Bower et al. | |
| 9,448,110 | B2 | 9/2016 | Wong | |
| 9,585,556 | B2 | 3/2017 | Buckland et al. | |
| 10,657,422 | B2* | 5/2020 | Garrison | G06K 9/6277 |
| 2002/0081013 | A1* | 6/2002 | Raz | G06T 7/155 |
| | | | | 382/133 |
| 2002/0193971 | A1* | 12/2002 | Whitsitt | G06K 9/3241 |
| | | | | 702/189 |
| 2012/0263382 | A1* | 10/2012 | Robinson | G01J 3/06 |
| | | | | 382/191 |
| 2013/0054603 | A1* | 2/2013 | Birdwell | G06K 9/6253 |
| | | | | 707/738 |
| 2013/0076913 | A1* | 3/2013 | Xu | H04N 5/232935 |
| | | | | 348/169 |
| 2013/0084007 | A1* | 4/2013 | Salamati | G06T 7/143 |
| | | | | 382/173 |
| 2014/0050352 | A1* | 2/2014 | Buehler | G01N 21/359 |
| | | | | 382/103 |
| 2014/0050406 | A1* | 2/2014 | Buehler | G06T 7/20 |
| | | | | 382/191 |
| 2014/0163389 | A1* | 6/2014 | Kudenov | A61B 5/0075 |
| | | | | 600/476 |
| 2014/0240477 | A1* | 8/2014 | Feng | G06T 5/008 |
| | | | | 348/77 |
| 2015/0044098 | A1* | 2/2015 | Smart | G01J 3/2823 |
| | | | | 422/82.05 |
| 2016/0334276 | A1 | 11/2016 | Pluvinage | |
| 2017/0076438 | A1* | 3/2017 | Kottenstette | G06K 9/627 |
| 2017/0161592 | A1* | 6/2017 | Su | G06T 7/74 |
| 2017/0316282 | A1* | 11/2017 | Ritter | G06K 9/2018 |

OTHER PUBLICATIONS

Camps-Valls etal.; "Advances in Hyperspectral Image Classification"; IEEE Signal Processing Magazine, vol. 31, No. 1, Jan. 2014, pp. 45-54. (Year: 2014).*

Background Modeling using Mixture of Gaussians for Foreground Detection —A Survey, T. Bouwmans et al., hal-00338206, version Nov. 1-12, 2008, pp. 219-237 (Year: 2008).*

Hyperspectral Image Classification Using Gaussian mixture Models and Markov Random Fields, Saurabh Prasad et al, IEEE, 1545-598X, 2013, pp. 153-157 (Year: 2013).*

* cited by examiner

METHODS AND SYSTEMS FOR HYPER-SPECTRAL SYSTEMS

CROSS-REFERENCE TO RELATED APPLICATIONS

This application is a continuation application of U.S. patent application Ser. No. 15/492,236, filed Apr. 20, 2017, entitled "METHODS AND SYSTEMS FOR HYPER-SPECTRAL SYSTEMS," the entire contents of which are hereby incorporated by reference in their entirety.

BACKGROUND

The field of the disclosure relates generally to analyzing hyperspectral imagery, and more specifically, to designing and training hyperspectral systems.

Hyperspectral systems may be used for a large variety of missions, including, but not limited to, search and rescue, forestry, natural gas exploration, geology, agricultural analysis, and archeology. Prior to deployment, a hyperspectral system is trained to recognize items of interest in contrast to background or environment details. In many cases, this training is performed by having the hyperspectral system analyze a large plurality of hyperspectral images to learn how to differentiate pixels associated with items of interest from pixels associated with the background of the image. For example, a hyperspectral system may be trained to be able to recognize a tent in contrast to the surrounding forest. Depending on the mission, the hyperspectral system requires different training to recognize important features in contrast to background details. Proper training of a hyperspectral system may be expensive both in setting up and in training time. Furthermore, without proper design, the hyperspectral system may require additional training to meet the requirements of the mission.

BRIEF DESCRIPTION

A hyperspectral analysis computer device is provided. The hyperspectral analysis computer device includes at least one processor in communication with at least one memory device. The hyperspectral analysis computer device is configured to store a plurality of spectral analysis data, receive at least one background item and at least one item to be detected from a user, generate one or more spectral bands for analysis based on the at least one background item, the at least one item to be detected, and the stored plurality of spectral analysis data, receive one or more mission parameters from the user, and determine a probability of success based on the one or more mission parameters and the generated one or more spectral bands.

In another aspect, a method for analyzing hyperspectral imagery is provided. The method is implemented using a hyperspectral analysis computer device. The hyperspectral analysis computer device includes a processor in communication with a memory. The method includes storing, in the memory, a plurality of spectral analysis data, receiving, from a user, at least one background item and at least one item to be detected, generating, by the processor, one or more spectral bands for analysis based on the at least one background item, the at least one item to be detected, and the stored plurality of spectral analysis data, receiving, from the user, one or more mission parameters, and determining, by the processor, a probability of success based on the one or more mission parameters and the generated one or more spectral bands.

In yet another aspect, at least one non-transitory computer-readable storage media having computer-executable instructions embodied thereon is provided. When executed by at least one processor, the computer-executable instructions cause the processor to store a plurality of spectral analysis data, receive, from a user, at least one background item and at least one item to be detected, generate one or more spectral bands for analysis based on the at least one background item, the at least one item to be detected, and the stored plurality of spectral analysis data, receive, from the user, one or more mission parameters, and determine a probability of success based on the one or more mission parameters and the generated one or more spectral bands.

BRIEF DESCRIPTION OF THE DRAWINGS

FIG. 1 is a schematic diagram illustrating an example system for designing and training hyperspectral systems.

FIG. 2 is a simplified block diagram of an example hyperspectral analysis system used for designing and training hyperspectral systems in accordance with FIG. 1.

FIG. 3 illustrates an example configuration of a client system shown in FIG. 2, in accordance with one embodiment of the subject disclosure.

FIG. 4 illustrates an example configuration of a server system shown in FIG. 2, in accordance with one embodiment of the subject disclosure.

FIG. 5 is a flow chart of a process for analyzing hyperspectral systems using the system shown in FIG. 2.

FIG. 6 is a diagram of components of one or more example computing devices that may be used in the system shown in FIG. 2.

Figure 1:
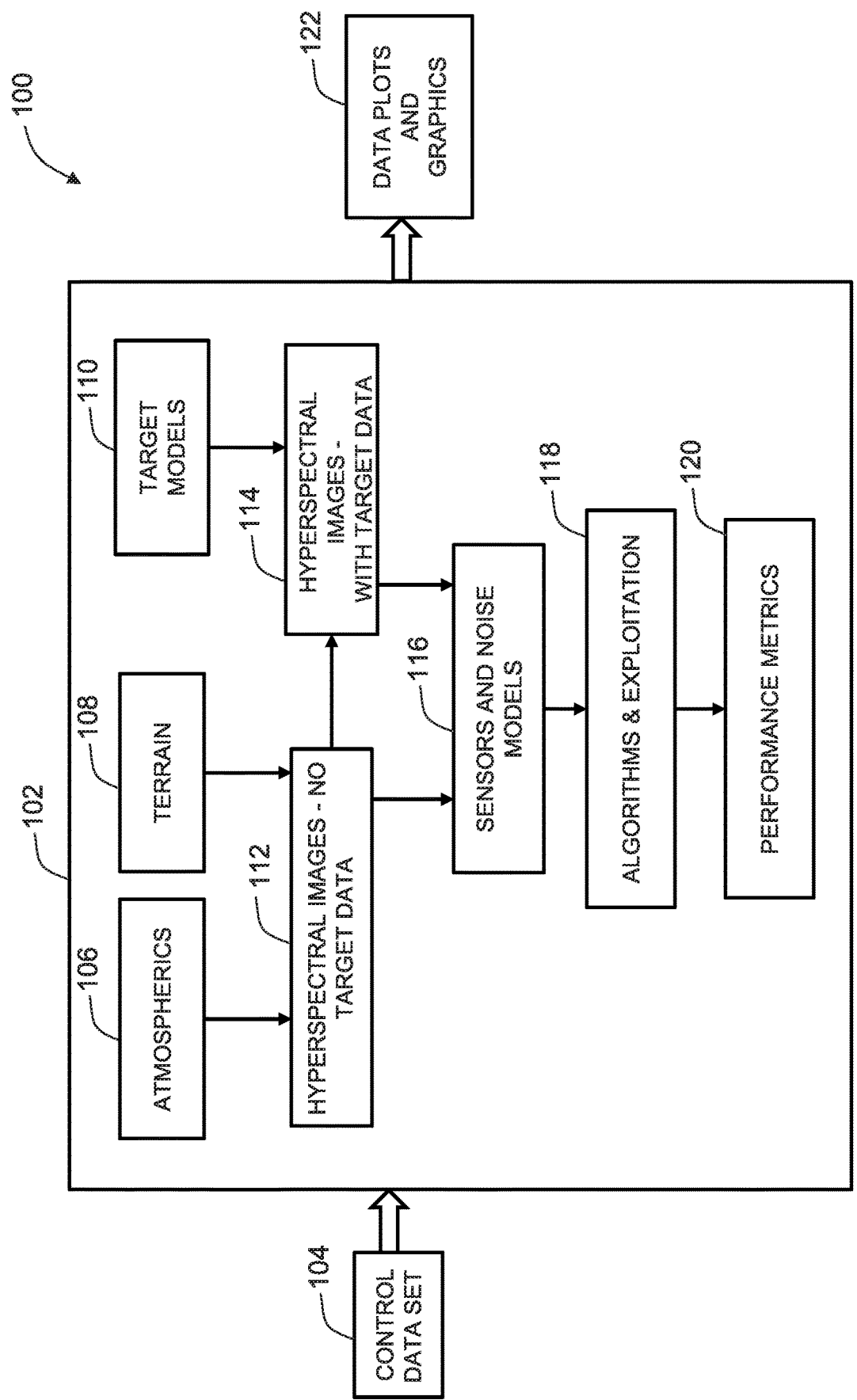
FIGS. 1-6 show example embodiments of the methods and systems described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The implementations described herein relate to hyperspectral imagery, and, more specifically, to designing and training hyperspectral systems. More specifically, a hyperspectral analysis ("HA") computer device (also known as a HA server) analyzes hyperspectral images to detect items of interest. The HA computer device utilizes machine learning techniques to analyze a plurality of predetermined images to determine the spectral bands most appropriate to both the potential items of interest and the background details.

Described herein are computer systems such as the HA computer devices and related computer systems. As described herein, all such computer systems include a processor and a memory. However, any processor in a computer device referred to herein may also refer to one or more processors wherein the processor may be in one computing device or in a plurality of computing devices acting in parallel. Additionally, any memory in a computer device referred to herein may also refer to one or more memories wherein the memories may be in one computing device or in a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the subject disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only and thus, are not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 is a schematic diagram illustrating an example system 100 for designing and training hyperspectral systems.

A hyperspectral system collects and processes information from across the electromagnetic spectrum. The hyperspectral system is configured to obtain the spectrum for the pixels in the image of a scene, with the purpose of finding objects, identifying materials, or detecting processes. Example hyperspectral system may include, but are not limited to, one of a push broom scanning and snapshot hyperspectral imaging.

In push broom scanning, the camera images the scene line by line using the "push broom" scanning mode. One narrow spatial line in the scene is imaged at a time, and this line is split into its spectral components before reaching a sensor array. When the sensor array is a two-dimensional (2D) sensor array, one dimension is used for spectral separation and the second dimension is used for imaging in one spatial direction. The second spatial dimension in the scene arises from scanning the camera over the scene (e.g., aircraft movement). The result can be seen as one 2D image for each spectral channel. Alternatively every pixel in the image contains one full spectrum. In snapshot hyperspectral imaging, the camera generates an image of the scene at a specific point in time.

The human eye sees color of visible light in mostly three bands (red, green, and blue), spectral imaging divides the spectrum into many more bands. This technique of dividing images into bands can be extended beyond the visible. In hyperspectral imaging, the recorded spectra have fine wavelength resolution and cover a wide range of wavelengths. For each pixel in an image, a hyperspectral camera acquires the light intensity (radiance) for a large number (typically a few tens to several hundred) of contiguous spectral bands. Every pixel in the image thus contains a continuous spectrum (in radiance or reflectance) and can be used to characterize the objects in the scene with great precision and detail.

Hyperspectral cameras provide significantly more detailed information about the scene than a normal color camera, which only acquires three different spectral channels corresponding to the visual primary colors red, green and blue. Hence, hyperspectral imaging leads to a vastly improved ability to classify the objects in the scene based on their spectral properties. This ability is very important in circumstances of distinguishing or identifying items of interest that may or may not be in a hyperspectral image. Hyperspectral analysis allows for the identification of items (or subjects) of interest in backgrounds that may include ground cover (such as cultivated and uncultivated fields, brush, forests, and deserts), geographic features (such as rivers, valleys, mountains, and plains), and human artifacts (such as isolated buildings, bridges, highways, and suburban and urban structures).

In the example embodiments, hyperspectral camera is placed on an airborne platform for remote sensing, such as an aircraft or satellite. The hyperspectral system includes multiple attributes that affect the ability of the hyperspectral system to collect data and images. These attributes include, but are not limited to, aperture size, altitude, off-nadir angle, and spectral resolution.

In the example embodiment, system includes a hyperspectral analysis ("HA") computer device 102. HA computer device 102 is configured to receive a control data set 104. In the example embodiment, control data set 104 includes information about one or more missions for a hyperspectral system. In some embodiments, the hyperspectral system is designated for the mission. In other embodiments, the hyperspectral system is in the design phase. In the example embodiment, the information includes one or more parameters of the hyperspectral system. The information in control data set 104 may also include, but is not limited to, minimum detectable or identifiable quantity settings, probability of false alarm, and probability of detection limits, noise operability requirements, focal plane array operability requirements, contamination requirements, seasonal and background performance dependencies, and day vs. night performance requirements. Control data set 104 also may include information about the items of interest (also known as items to be detected). This information about the item(s) of interest may include material composition, potential thermal characteristics, and other information necessary to model said item(s) of interest. Control data set 104 may also include further information about the location(s) that may be analyzed, such as, but not limited to, terrain type, climate information, geographic locations, and other information necessary to model the background of the images that the item(s) of interest will be compared against.

HA computer device 102 receives control data set 104 and uses control data set 104 to analyze the hyperspectral system in question. In the example embodiment, HA computer device 102 includes, or is in communication with a database, that includes a plurality of hyperspectral analysis data. This hyperspectral analysis data may include, but is not limited to, Fourier transform imaging spectroscopy (FTIS) models, dispersive sensor models, moderate resolution atmospheric transmission models, bands, and geometry, a plurality of previously modeled terrain and urban materials, and a plurality of previously modeled gaseous and solid targets. HA computer device 102 uses the stored hyperspectral analysis data to perform the embodiments described herein.

Based on information in control data set 104, HA computer device 102 determines the atmospherics 106 and terrain 108 associated with control data set 104. For example, terrain 108 may include, but is not limited to ground cover (such as cultivated and uncultivated fields, brush, forests, and deserts), geographic features (such as rivers, valleys, mountains, and plains), and human artifacts (such as isolated buildings, bridges, highways, and suburban and urban structures). HA computer device 102 also determines target models 110 associated with control data set 104. For example, if the mission in control data set 104 includes locating lost hikers in a forest in Washington State, then HA computer device 102 locates atmospherics 106 and terrain 108 data from the hyperspectral analysis data associated with that state. HA computer device 102 also determines the target models 110 for recognizing hikers in a forest environment based on data about the clothing and gear that the hikers may have taken.

HA computer device 102 determines the end-members associated with the determined atmospherics 106 (also known as atmospheric conditions) and terrain 108. End-members are spectra that are chosen to represent pure surface materials in a spectral image. In the example embodiment, HP computer device 102 stores a plurality of data including end-members associated with different atmospherics 106, terrain 108, and materials. HA computer device 102 uses those end-members to mix a plurality of hyperspectral images without target data 112 for training the hyperspectral system. In the example embodiment, the plurality of hyperspectral images are pixelated images with specific statistical properties (spectral distribution). Within each image, HA computer device 102 creates individual pixels with specific statistical properties, based on known spectral properties of the items of interest, relevant terrains, atmospheric, and lighting conditions. In some embodiments, the images are collections of pixels instead of synthetic images that include realistic ground cover, geographic features, and/or human artifacts.

In the example embodiment, HA computer device 102 determines end-members associated with target models 110. HA computer device 102 combines those end-members with some of the plurality of hyperspectral images without target data 112 to generate a plurality of hyperspectral images with target data 114. HA computer device 102 then applies sensor and noise models 116 to the two sets of hyperspectral images 112 and 114 to simulate field conditions. In the example embodiment, sensor and noise models 116 include but are not limited to, Fourier transform imaging spectroscopy (FTIS) models and dispersive models. Sensor and noise models 116 simulate data errors and other interference in the reading of a hyperspectral system, when the hyperspectral system is in use.

More specifically, HA computer device 102 generates the plurality of hyperspectral images by generating a distribution of simulated individual pixel measurements based on random mixes of end-members. The distribution is based on the mission parameters, so that the mixes of end-members simulate the differences between pixels that may be seen in an actual mission with those mission parameters. HA computer device 102 varies the random mixes so that some combinations are more likely in some of the plurality of hyperspectral images than others based on the mission parameters. Instead of generating a hypercube of an image scene, HA computer device 102 generates the plurality of hyperspectral images that include the random distribution of pixels to allow for training of a hyperspectral system in a more efficient manner than having to generate an actual three dimensional (3D) scene (spatial×spatial×wavelength). Instead, HA computer device 102 can quickly generate the plurality of hyperspectral images that can include a variety of conditions and combinations of pixels that can be used to test hyperspectral systems.

In some other embodiments, HA computer device 102 uses a previously generated hyperspectral image as an input in generating the plurality of hyperspectral images. Other potential inputs used to generate the plurality of hyperspectral images include, but are not limited to, one or more images of a similar environment, one or more images including a similar item of interest, and one or more images previously captured by a hyperspectral system. In these embodiments, HA computer device 102 applies the input images to generate the distribution of simulated individual pixel measurements based on random mixes of end-members.

In some further embodiments, HA computer device 102 generates the plurality of hyperspectral images to simulate a hypercube scene. In a first example, HA computer device 102 applies an appropriate random distribution of pixels to a pre-existing hypercube scene. In these embodiments, HA computer device 102 applies the simulated hypercube scene to generate the distribution of simulated individual pixel measurements based on random mixes of end-members.

HA computer device 102 applies algorithms and exploitations 118 to the two sets of hyperspectral images 112 and 114 to determine performance metrics 120. Examples of algorithms and exploitation include, but are not limited to, best linear unbiased estimation and orthogonal subspace projection. Examples of performance metrics include, but are not limited to, signal-to-noise ratio (SNR), signal compression ratio (SCR), probability of detection (Pd), probability of false alarms (Pfa), minimum detectable quantity (MDQ), and minimum identifiable quantity (MIQ). In the example embodiment, HA computer device 102 generates data plots and graphics 122 based on performance metrics 120. In the example embodiment, HA computer device 102 outputs performance metrics 120 and data plots and graphics 122 to a user.

In one embodiment, HA computer device 102 receives the mission parameters and requirements in control data set 104. HA computer device 102 determines atmospherics 106, terrain 108, and target models 110 based on control data set 104. HA computer device 102 generates a plurality of hyperspectral images without target data 112 and a plurality of hyperspectral images with target data 114 to apply to hyperspectral system. Based on the attributes of hyperspectral system, HA computer device 102 simulates the behavior of hyperspectral system in analyzing both of the pluralities of hyperspectral images 112 and 114 by applying sensor and noise models 116 to the pluralities of hyperspectral images 112 and 114. Based on the simulation, HA computer device 102 uses algorithms and exploitations 118 to determine performance metrics 120 for the hyperspectral system for the mission parameters and requirements in control data set 104. Examples of mission parameters include, but are not limited to minimum aperture size, waveband required, required wavelength range, minimum spectral resolution, integration time, ground sample distances, day or night operation, and maximum off-nadir angle.

In still further embodiments, HA computer device 102 transmits the plurality of images without target data 112 and a plurality of images with target data 114 to the hyperspectral system and instructs the hyperspectral system to analyze those images. The hyperspectral system analyzes each image and identifies where the hyperspectral system recognized an item of interest. The hyperspectral system reports its results to HA computer device 102. HA computer device 102 analyzes the results of the hyperspectral systems analysis to determine the accuracy of the hyperspectral system.

Figure 2:
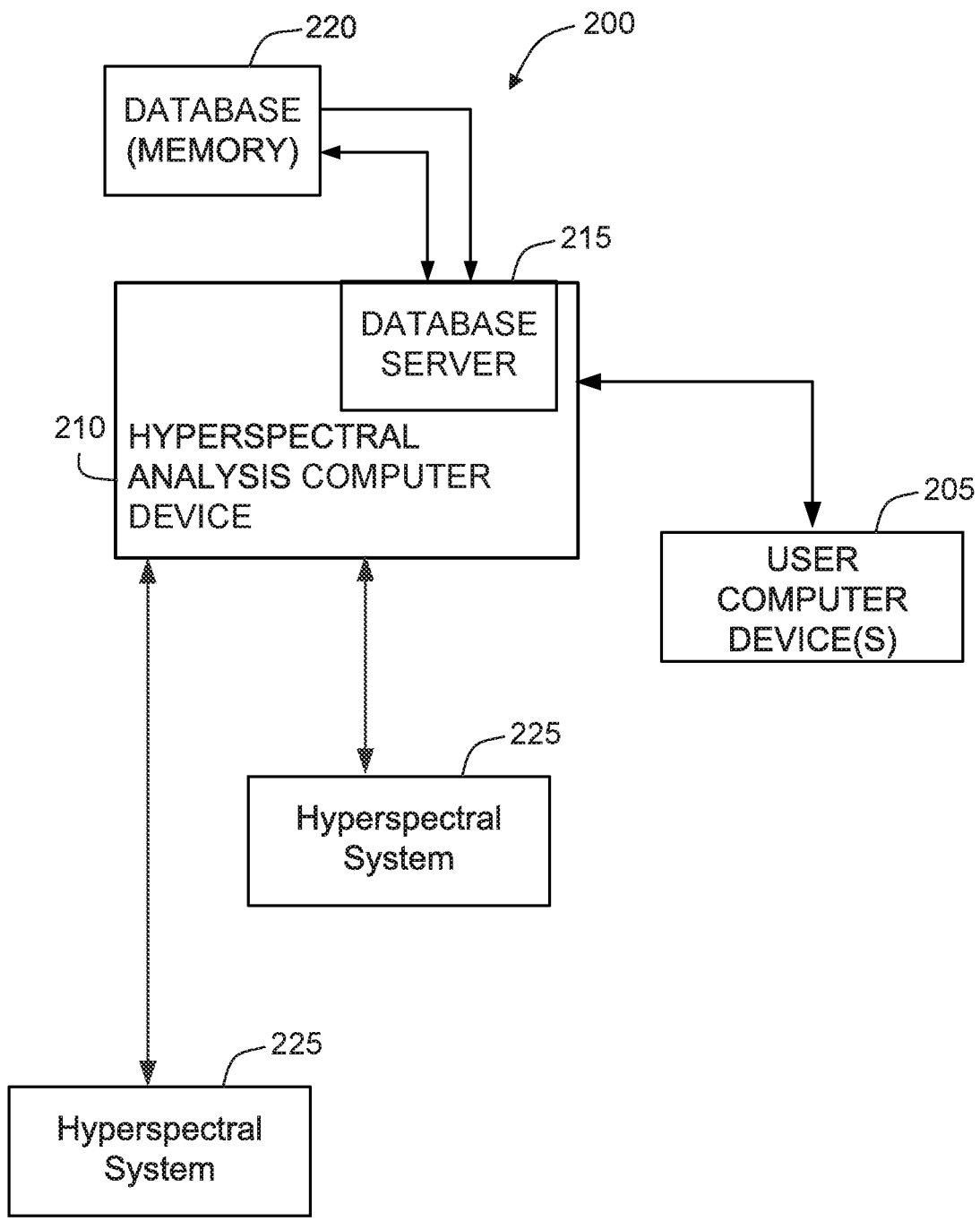

FIG. 2 is a simplified block diagram of an example hyperspectral analysis system 200 used for designing and training hyperspectral systems 225. In the example embodiment, system 200 may be used for designing and training hyperspectral systems 225 in preparation for one or more missions. As described below in more detail, a hyperspectral analysis ("HA") computer device 210, which is similar to HA computer device 102 (shown in FIG. 1), is configured to store a plurality of spectral analysis data. HA computer device 210 is also configured to receive, from a user, at least one background item and at least one item to be detected. HA computer device 210 is further configured to generate one or more spectral bands for analysis based on the at least one background item, the at least one item to be detected, and the stored plurality of spectral analysis data. Moreover, HA computer device 210 is configured to receive, from the user, one or more mission parameters. In addition, HA computer device 210 is configured to determine a probability of success based on the one or more mission parameters and the generated one or more spectral bands.

In the example embodiment, user computer devices 205 are computers that include a web browser or a software application to enable user computer devices 205 to access HA computer device 210 using the Internet or a network. More specifically, user computer devices 205 are communicatively coupled to HA computer device 210 through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 205 can be any device capable of accessing the Internet, or another network, including, but not limited to, a desktop computer, a laptop computer, a personal digital assistant (PDA), a cellular phone, a smartphone, a tablet, a phablet, or other web-based connectable equipment. In the example embodiment, a user uses a user computer device 205 to enter mission parameters and receive design information and spectral bands for the device associated with the mission.

HA computer device 210 includes one or more computer devices configured to perform as described herein. In the example embodiment, HA computer device 210 includes one or more server systems configured to communicate with user computer device 205 and hyperspectral systems 225. In some embodiments, HA computer device 210 is remote from at least one of user computer device 205, database server 215, and hyperspectral system 225 and communicates with the remote computer device through the Internet. More specifically, HA computer device 210 is communicatively coupled to Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. HA computer device 210 can be any device capable of accessing the Internet, or another network, including, but not limited to, a desktop computer, a laptop computer, a personal digital assistant (PDA), a cellular phone, a smartphone, a tablet, a phablet, or other web-based connectable equipment.

A database server 215 is communicatively coupled to a database 220 that stores data. In one embodiment, database 220 includes mission parameters, spectral bands, probability of detection, and device attributes. In the example embodiment, database 220 is stored remotely from HA computer device 210. In some embodiments, database 220 is decentralized. In the example embodiment, a person can access database 220 via user computer devices 205 by logging onto HA computer device 210, as described herein.

Hyperspectral systems 225 include hyperspectral cameras and/or other devices capable of taking hyperspectral images. Hyperspectral systems 225 may include a plurality of optics that allow the system to perform as described herein. In the example embodiment, hyperspectral systems 225 are in communication with HA computer device 210. More specifically, hyperspectral systems 225 are communicatively coupled to HA computer device 210 through many interfaces including, but not limited to, at least one of the Internet, a network, such as a local area network (LAN), a wide area network (WAN), or an integrated services digital network (ISDN), a dial-up-connection, a digital subscriber line (DSL), a cellular phone connection, and a cable modem. Hyperspectral system 225 collects and processes information from across the electromagnetic spectrum. Hyperspectral system 225 is configured to obtain the spectrum for each pixel in the image of a scene, with the purpose of finding objects, identifying materials, or detecting processes. Example hyperspectral system 225 may include, but are not limited to, one of a push broom scanning and snapshot hyperspectral imaging.

Figure 3:
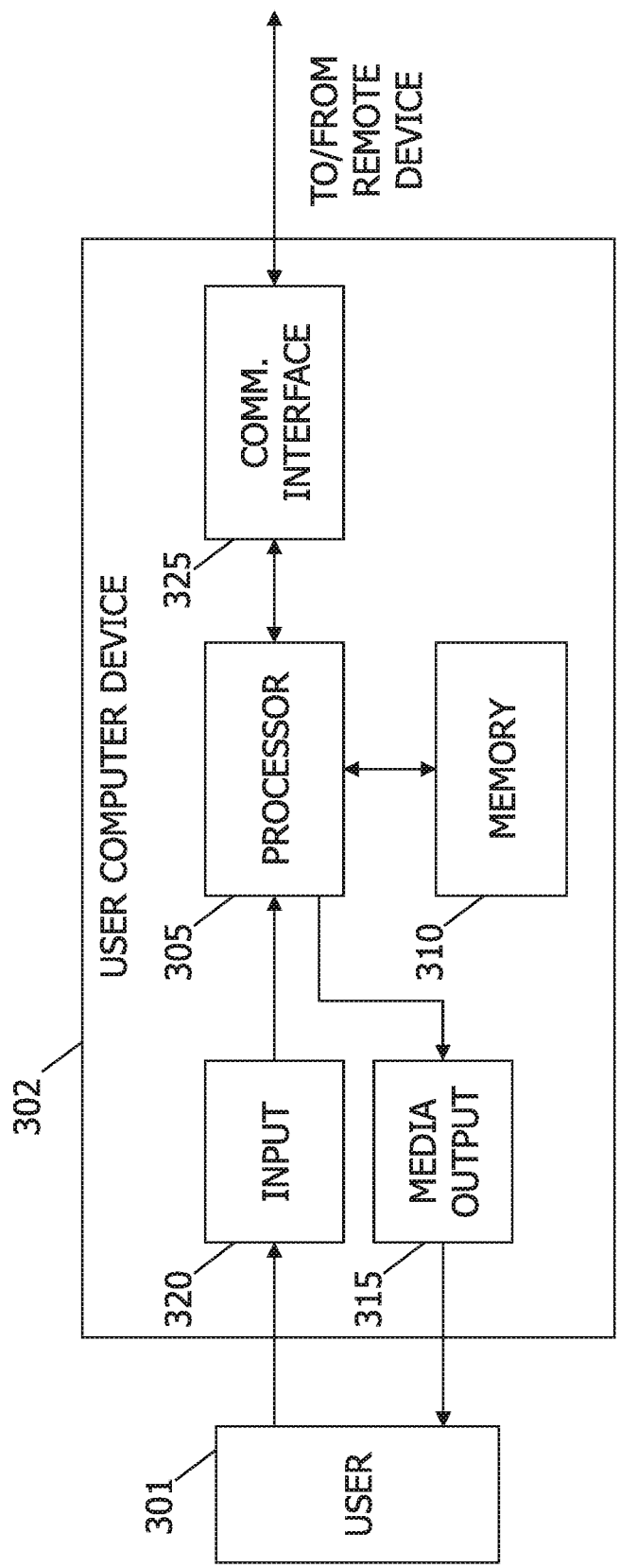

FIG. 3 illustrates an example configuration of a client system shown in FIG. 2, in accordance with one embodiment of the subject disclosure. User computer device 302 is operated by a user 301. User computer device 302 may include, but is not limited to, user computer device 205 and hyperspectral system 225 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, analysis of one or more hyperspectral images. In some embodiments, user computer device 302 includes an input device 320 for receiving input from user 301. User 301 may use input device 320 to, without limitation, select and/or enter one or more mission parameters or device parameters. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as HA computer device 210 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from HA computer device 210. A client application allows user 301 to interact with, for example, HA computer device 210. For example, instructions may be stored by a cloud service and the output of the execution of the instructions sent to the media output component 315.

Figure 4:
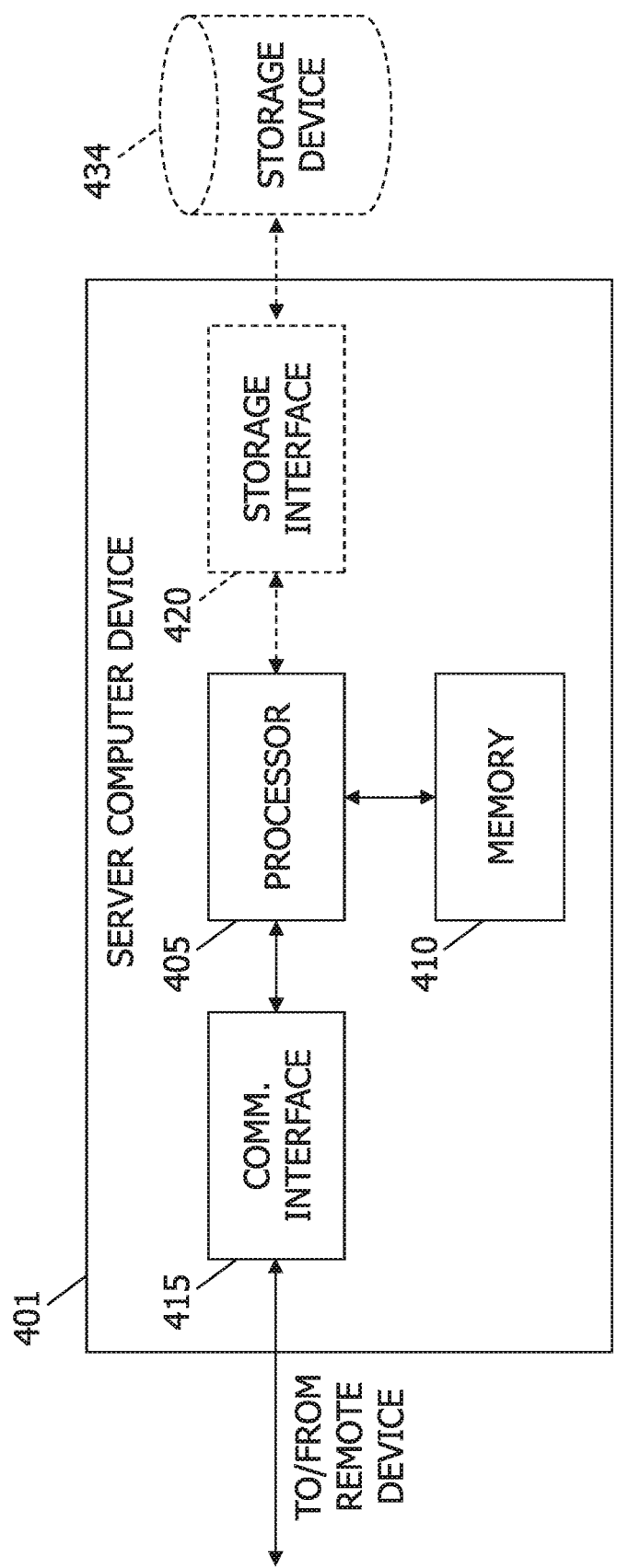

FIG. 4 illustrates an example configuration of a server system shown in FIG. 2, in accordance with one embodiment of the subject disclosure. Server computer device 401 may include, but is not limited to, database server 215 and HA computer device 210 (both shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, user computer device 205, hyperspectral system 225, or HA computer device 210 (all shown in FIG. 2). For example, communication interface 415 may receive requests from user computer devices 205 via the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
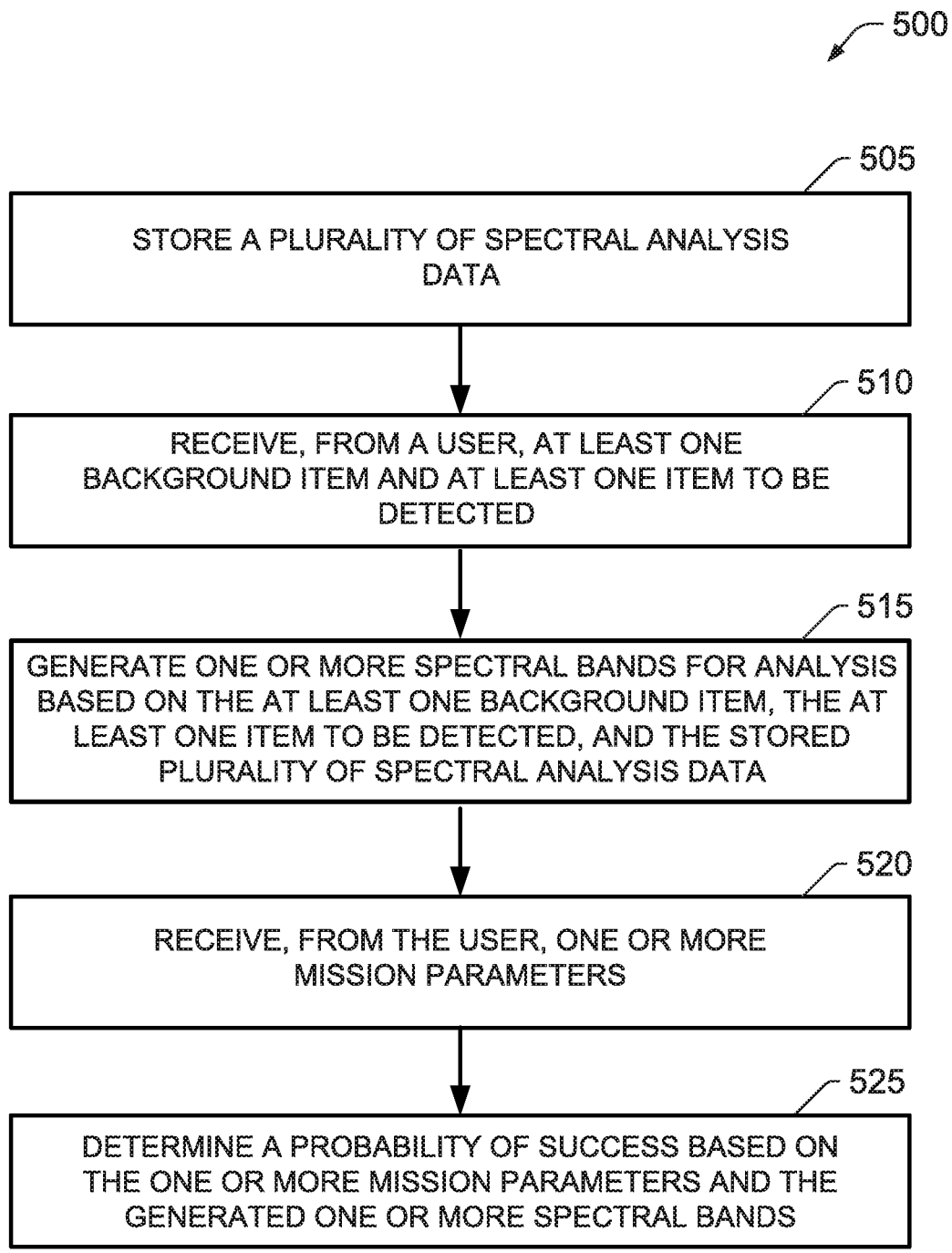

FIG. 5 is a flow chart of a process 500 for analyzing hyperspectral systems 225 using system 200 (shown in FIG. 2). In the example embodiment, process 500 is performed by HA computer device 210 (shown in FIG. 2).

In the example embodiment, HA computer device 210 stores 505 a plurality of spectral analysis data. In the example embodiment, the spectral analysis data includes, but is not limited to, Fourier transform imaging spectroscopy (FTIS) models, dispersive sensor models, moderate resolution atmospheric transmission models, bands, and geometry, a plurality of previously modeled terrain and urban materials, and a plurality of previously modeled gaseous and solid targets. In some embodiments, the spectral analysis data is stored in database 220 (shown in FIG. 2).

In the example embodiment, HA computer device 210 receives 510 at least one background item and at least one item to be detected from a user. In some embodiments, HA computer device 210 receives 510 this data in control data set 104 (shown in FIG. 1). In other embodiments, HA computer device 210 receives 510 this data directly from user. The at least one background item may include terrain information, terrain type, climate information, geographic locations, and other information necessary to model the background of the images that the item(s) of interest will be compared against. Furthermore, background may include ground cover (such as cultivated and uncultivated fields, brush, forests, and deserts), geographic features (such as rivers, valleys, mountains, and plains), and human artifacts (such as isolated buildings, bridges, highways, and suburban and urban structures). In some embodiments, the at least one item to be detected includes information about the item(s) of interest, such as material composition, potential thermal characteristics, and other information necessary to model said item(s) of interest. In other embodiments, the at least one item to be detected includes a name or type. HA computer device 210 queries database 220 to retrieve data about modeling the at least one item to be detected.

In the example embodiment, HA computer device 210 generates 515 one or more spectral bands for analysis based on the at least one background item, the at least one items to be detected, and the store plurality of spectral analysis data.

HA computer device 210 receives 520 one or more mission parameters from the user. In some embodiments, HA computer device 210 receives 520 this data in control data set 104. In other embodiments, HA computer device 210 receives 520 this data directly from the user. In the example embodiment, the one or more mission parameters includes at least one of a maximum false alarm rate, a probability of detection, a mission altitude, an aperture size, an off-nadir angle, a spectral resolution, minimum aperture size, waveband required, required wavelength range, minimum spectral resolution, integration time, ground sample distances, day or night operation, and maximum off-nadir angle.

HA computer device 210 determines 525 a probability of success for the mission based on the one or more mission parameters and the generated one or more spectral bands. HA computer device 210 outputs the probability of success to the user.

In some embodiments, HA computer device 210 determines a probability of false alarms and a probability of detection based on the one or more mission parameters and the generated one or more spectral bands. False alarms are where hyperspectral system 225 identifies an item of interest where there is none, also known as a false positive. Detection is where hyperspectral system 225 accurately identifies an item of interest.

In some embodiments, HA computer device 210 determines at least one of mission altitude, aperture size, off-nadir angle, and spectral resolution based on the probability of success, the one or more mission parameters, and the generated one or more spectral bands. For example, a mission to try to detect missing hikers in Indiana State Forest is planned. The hyperspectral system 225 that is planning to be used is known and will be mounted on an airplane. To achieve a probability of detecting the hikers, HA computer device 210 calculates that the plane needs to fly at 25,000 feet over the forest. In another example, a hyperspectral system 225 is planned on a satellite for monitoring agriculture in Missouri. Based on the planned mission and known parameters of the system, HA computer device 210 calculates that the aperture should be 2 meters. In a further example, the user is able to change attributes of proposed hyperspectral system 225 to determine increased performance of hyperspectral system 225.

In a further embodiment, HA computer device 102 determines a candidate hyperspectral system 225 for a specific mission. In this embodiment, HA computer device 102 receives the attributes of a plurality of hyperspectral systems 225. HA computer device 102 also receives mission parameters for a specific mission or set of missions of interest. These mission parameters may include, but are not limited to, minimum aperture size, waveband required, required wavelength range, minimum spectral resolution, integration time, ground sample distances, day or night operation, and maximum off-nadir angle. Using the mission parameters, HA computer device 102 is able to determine which of the plurality of hyperspectral systems 225 fits within the mission parameters. Furthermore, HA computer device 102 is also able to calculate the probability of success for the determine hyperspectral system 225. In this environment, HA computer device 102 calculates other operational values for the mission, such as altitude. This allows a user to select an appropriate hyperspectral system 225 for a mission, when there are a plurality of hyperspectral systems 225 with different parameters.

In still a further environment, HA computer device 102 receives mission parameters for one or more missions of interest. HA computer device 102 calculates the required parameters of a hyperspectral system 225 to complete the mission to with the desired probability of success. This allows the user to determine required design parameters of a hyperspectral system 225, such as in the design phase of a system.

In some embodiments, HA computer device 102 generates a plurality of images 112 and 114 that each contain a plurality of random pixel mixtures associated with the at least one background item to train a program to recognize the at least one item to detect.

Figure 6:
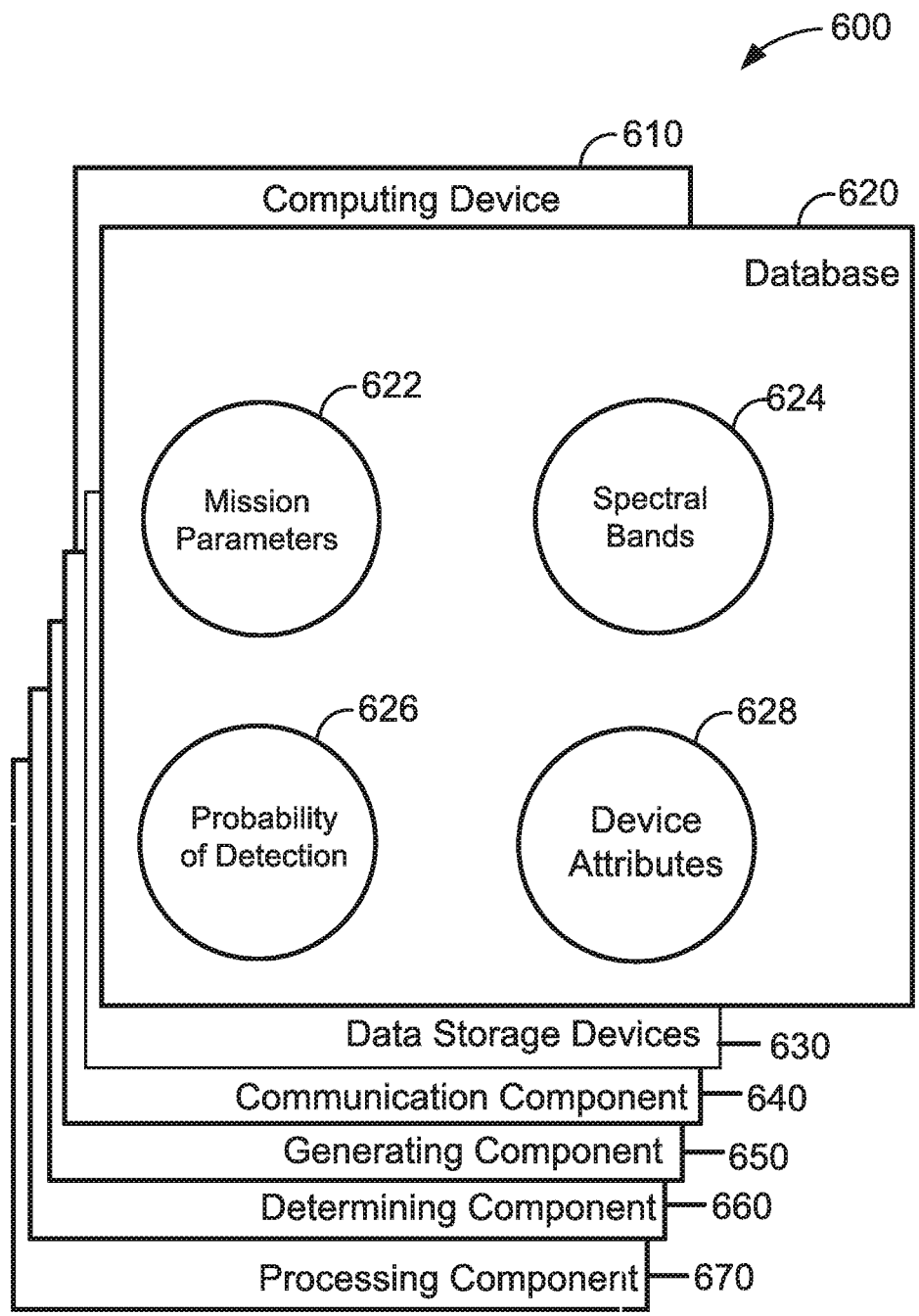

FIG. 6 is a diagram 600 of components of one or more example computing devices that may be used in system 200 shown in FIG. 2. In some embodiments, computing device 610 is similar to HA computer device 210 (shown in FIG. 2). Database 620 may be coupled with several separate components within computing device 610, which perform specific tasks. In this embodiment, database 620 includes mission parameters 622, spectral bands 624, probability of detection 626, and device attributes 628. In some embodiments, database 620 is similar to database 220 (shown in FIG. 2).

Computing device 610 includes database 620, as well as data storage devices 630. Computing device 610 also includes a communication component 640 for receiving 510 at least one background item and receiving 520 one or more mission parameters (both shown in FIG. 5). Computing device 610 also includes a generating component 650 for generating 515 one or more spectral bands (shown in FIG. 5). Computing device 610 further includes a determining component 660 for determining 525 a probability of success (shown in FIG. 5). A processing component 670 assists with execution of computer-executable instructions associated with the system.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, previous hyperspectral analysis data, materials data, and other data. The machine learning programs may utilize deep learning algorithms that may be primarily focused on pattern recognition, and may be trained after processing multiple examples. The machine learning programs may include Bayesian program learning (BPL), image or object recognition, optical character recognition, pixel recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the hyperspectral system, one or more objects of interest in the image, background details, geolocation information, image data, and/or other data.

Based upon these analyses, the processing element may learn how to identify characteristics and patterns that may then be applied to analyzing sensor data, authentication data, image data, hyperspectral system data, and/or other data. For example, the processing element may learn to identify a location or object based upon minimal information or despite a misclassification by a user. The processing element may also learn how to identify different types of objects based upon differences in the received hyperspectral data.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described above, the implementations described herein relate to systems and methods for analyzing hyperspectral imagery, and more specifically, to designing and training hyperspectral systems to meet mission parameters. More specifically, a hyperspectral analysis ("HA") computer device determines the necessary attributes of a hyperspectral system to meet mission requirements. The HA computer device also efficiently trains the hyperspectral system to meet those mission requirements by efficiently generating images in the spectral bands necessary to complete the mission.

The above-described methods and systems for hyperspectral analysis are cost-effective, secure, and highly reliable. The methods and systems include determining hyperspectral system requirements during the design phase based on mission requirements, drastically reducing training time to allow hyperspectral systems to reach mission requirements, and improving the probability of successfully detecting items of interest. Furthermore, the above methods describe an alternative to generating a full hypercube "image-scene" for every combination that the user wishes to test. Instead, the systems and methods described herein describe a more cost-efficient and quicker method of training and analyzing a hyperspectral system by using random pixel distribution. Accordingly, the methods and systems facilitate improving the use and efficiency of hyperspectral systems in a cost-effective and reliable manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hyperspectral analysis computer device comprising at least one processor in communication with at least one memory device, said hyperspectral analysis computer device programmed to:
   store a plurality of spectral analysis data;
   receive, from a user interface, at least one background item, at least one item to be detected, and one or more mission parameters; and
   generate a plurality of images based on a distribution of simulated individual pixel measurements associated with the one or more mission parameters and the plurality of spectral analysis data, wherein the plurality of images comprise a plurality of random pixel mixtures associated with the at least one background item to train a program to recognize the at least one item to detect.

2. A hyperspectral analysis computer device in accordance with claim 1, wherein said hyperspectral analysis computer device is further programmed to:
generate one or more spectral bands for analysis based on the at least one background item, the at least one item to be detected, and the stored plurality of spectral analysis data; and
compare the one or more mission parameters to the generated one or more spectral bands to determine whether the at least one item will be detected.

3. A hyperspectral analysis computer device in accordance with claim 2, wherein said hyperspectral analysis computer device is further programmed to determine a probability of success of detection based on the one or more mission parameters and the generated one or more spectral bands.

4. A hyperspectral analysis computer device in accordance with claim 1, wherein the plurality of spectral analysis data comprises at least one of a Fourier transform imaging spectroscopy model, a dispersive sensor model, a moderate resolution atmospheric transmission model, band, and geometry, a plurality of previously modeled terrain and urban materials, or a plurality of previously modeled gaseous and solid targets.

5. A hyperspectral analysis computer device in accordance with claim 1, wherein said hyperspectral analysis computer device is further programmed to determine atmospherics data and terrain data associated with on the at least one background item, wherein the terrain data comprises at least one of ground cover, geographic features, or human artifacts.

6. A hyperspectral analysis computer device in accordance with claim 1, wherein said hyperspectral analysis computer device is further programmed to create individual pixels in the plurality of images with statistical properties based on known properties of at least one of the at least one background item, the at least one item to be detected, or the one or more mission parameters.

7. A hyperspectral analysis computer device in accordance with claim 1, wherein said hyperspectral analysis computer device is further programmed to generate the plurality of images to comprise at least one of sensor or noise models.

8. A hyperspectral analysis computer device in accordance with claim 1, wherein said hyperspectral analysis computer device is further programmed to generate the plurality of images to simulate a hypercube scene.

9. A hyperspectral analysis computer device in accordance with claim 1, wherein said hyperspectral analysis computer device is further programmed to generate the plurality of images based on at least one of previously generated hyperspectral images, one or more images of similar environment, one or more images comprising a similar item of interest, or one or more images previously captured by a hyperspectral system.

10. A hyperspectral analysis computer device in accordance with claim 9, wherein said hyperspectral analysis computer device is further programmed to:
generate a first plurality of images based on at least one item to be detected;
generate a second plurality of images without the at least one item to be detected;
transmit the first plurality of images and the second plurality of images to the hyperspectral system, wherein the hyperspectral system is programmed to analyze the first plurality of images and the second plurality of images;
receive, from the hyperspectral system, results of the analysis; and
determine an accuracy of the hyperspectral system based on the results of the analysis, the first plurality of images, and the second plurality of images.

11. A method, said method implemented using a hyperspectral analysis computer device, said hyperspectral analysis computer device comprising a processor in communication with a memory, said method comprising:
storing, in the memory, a plurality of spectral analysis data;
receiving first input data indicative of at least one background item and at least one item to be detected;
receiving second input data indicative of one or more mission parameters; and
generating, by the processor, a plurality of images based on a distribution of simulated individual pixel measurements associated with the one or more mission parameters and the plurality of spectral analysis data, wherein the plurality of images comprise a plurality of random pixel mixtures associated with the at least one background item to train a program to recognize the at least one item to detect.

12. A method in accordance with claim 11 further comprising:
generating, by the processor, one or more spectral bands for analysis based on the at least one background item, the at least one item to be detected, and the stored plurality of spectral analysis data; and
comparing, by the processor, the one or more mission parameters to the generated one or more spectral bands to determine whether the at least one item will be detected.

13. A method in accordance with claim 12 further comprising determining a probability of success of detection based on the one or more mission parameters and the generated one or more spectral bands.

14. A method in accordance with claim 11, wherein the plurality of spectral analysis data comprises at least one of Fourier transform imaging spectroscopy models, dispersive sensor models, moderate resolution atmospheric transmission models, bands, and geometry, a plurality of previously modeled terrain and urban materials, or a plurality of previously modeled gaseous and solid targets.

15. A method in accordance with claim 11 further comprising determining atmospherics data and terrain data associated with on the at least one background item, wherein the terrain data comprises at least one of ground cover, geographic features, or human artifacts.

16. A method in accordance with claim 11 further comprising creating individual pixels in the plurality of images with statistical properties based on known properties of at least one of the at least one background item, the at least one item to be detected, or the one or more mission parameters.

17. A method in accordance with claim 11 further comprising generating the plurality of images to comprise at least one of sensor or noise models.

18. A method in accordance with claim 11 further comprising generating the plurality of images to simulate a hypercube scene.

19. A method in accordance with claim 11 further comprising generating the plurality of images based on at least one of previously generated hyperspectral images, one or more images of similar environment, one or more images comprising a similar item of interest, or one or more images previously captured by a hyperspectral system.

20. A method in accordance with claim 19 further comprising:
- generating a first plurality of images based on at least one item to be detected;
- generating a second plurality of images without the at least one item to be detected;
- transmitting the first plurality of images and the second plurality of images to a hyperspectral system, wherein the hyperspectral system is programmed to analyze the first plurality of images and the second plurality of images;
- receiving, from the hyperspectral system, results of the analysis; and
- determining an accuracy of the hyperspectral system based on the results of the analysis, the first plurality of images, and the second plurality of images.

\* \* \* \* \*

UNITED STATES PATENT AND TRADEMARK OFFICE
CERTIFICATE OF CORRECTION

PATENT NO. : 11,270,167 B2
APPLICATION NO. : 16/868346
DATED : March 8, 2022
INVENTOR(S) : William Thomas Garrison et al.

It is certified that error appears in the above-identified patent and that said Letters Patent is hereby corrected as shown below:

On the Title Page

Item (72), Line 1, Under "Inventors", delete "Huntsille" and insert therefor -- Huntsville --.

Signed and Sealed this
Sixth Day of December, 2022

Katherine Kelly Vidal
*Director of the United States Patent and Trademark Office*